US010795602B1

(12) United States Patent
Gupta et al.

(10) Patent No.: US 10,795,602 B1
(45) Date of Patent: Oct. 6, 2020

(54) SELECTIVELY DESTAGING DATA UPDATES FROM WRITE CACHES ACROSS DATA STORAGE LOCATIONS

(71) Applicant: International Business Machines Corporation, Armonk, NY (US)

(72) Inventors: Lokesh M. Gupta, Tucson, AZ (US); Kyler A. Anderson, Sahuarita, AZ (US); Kevin John Ash, Tucson, AZ (US); Matthew G. Borlick, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/428,087

(22) Filed: May 31, 2019

(51) Int. Cl.
*G06F 3/06* (2006.01)
*G06F 12/0866* (2016.01)

(52) U.S. Cl.
CPC ............ *G06F 3/065* (2013.01); *G06F 3/0604* (2013.01); *G06F 3/067* (2013.01); *G06F 12/0866* (2013.01)

(58) Field of Classification Search
CPC ........ G06F 3/0604; G06F 3/065; G06F 3/067; G06F 12/0866
See application file for complete search history.

(56) References Cited

U.S. PATENT DOCUMENTS

| | | | |
|---|---|---|---|
| 7,577,787 B1 | 8/2009 | Yochai et al. | |
| 8,566,518 B2 | 10/2013 | Beardsley et al. | |
| 9,087,006 B2 | 7/2015 | Yochai et al. | |
| 9,524,244 B2 | 12/2016 | Boden et al. | |
| 9,727,272 B2 | 8/2017 | Ash et al. | |
| 9,767,021 B1 | 9/2017 | Wu et al. | |
| 2011/0191534 A1* | 8/2011 | Ash ................. | G06F 12/0868 711/113 |
| 2012/0260044 A1* | 10/2012 | Beardsley ........... | G06F 12/0804 711/133 |

(Continued)

OTHER PUBLICATIONS

Nam, Young Jin et al. An Adaptive High-Low Water Mark Destage Algorithm for Cached RAID5, Proceedings of the 2002 Pacific Rim International Symposium on Dependable Computing (PRDC'02), p. 177-184, 8p. Publisher: IEEE, [online], [retreived May 22, 2020]. (Year: 2002).*

(Continued)

*Primary Examiner* — Eric T Oberly
(74) *Attorney, Agent, or Firm* — Zilka-Kotab, P.C.

(57) ABSTRACT

A computer-implemented method according to one embodiment includes, for each portion of data in a write cache: determining whether a given portion of data was added to the write cache prior to completion of a most recent flash copy operation. In response to determining that the given portion of data was not added to the write cache prior to completion of a most recent flash copy operation, a determination is made of whether the given portion of data has a clock bit value corresponding thereto. In response to determining that the given portion of data does not have a clock bit value corresponding thereto, a clock bit value calculated for the given portion of data based on a current amount of unused storage capacity in the write cache. Moreover, in response to determining that the given portion of data has a clock bit value corresponding thereto, it is decremented.

20 Claims, 6 Drawing Sheets

(56) References Cited

U.S. PATENT DOCUMENTS

| | | |
|---|---|---|
| 2013/0024628 A1* | 1/2013 | Benhase ............ G06F 12/0891 |
| | | 711/144 |
| 2013/0132655 A1 | 5/2013 | Belluomini et al. |
| 2013/0198752 A1 | 8/2013 | Benhase et al. |
| 2016/0342542 A1 | 11/2016 | Voigt |
| 2018/0322280 A1 | 11/2018 | Borlick et al. |
| 2018/0373638 A1 | 12/2018 | Ash et al. |
| 2019/0057042 A1 | 2/2019 | Anderson et al. |

OTHER PUBLICATIONS

Yue et al., "Rotated Logging Storage Architectures for Data Centers: Models and Optimizations," IEEE Transactions on Computers, vol. 65, No. 1, Jan. 2016, pp. 203-215.

Gill et al., "WOW: Wise Ordering for Writes—Combining Spatial and Temporal Locality in Non-Volatile Caches," 4th USENIX Conference on File and Storage Technologies (FAST '05), 2005, pp. 129-142.

Hu et al., "PUD-LRU: An Erase-Efficient Write Buffer Management Algorithm for Flash Memory SSD," 18th Annual IEEE/ACM International Symposium on Modeling, Analysis and Simulation of Computer and Telecommunication Systems, Aug. 17-19, 2010, 11 pages.

Baek et al., "Matrix Stripe Cache-Based Contiguity Transform for Fragmented Writes in RAID-5," IEEE Transactions on Computers, vol. 56, No. 8, Aug. 2007, pp. 1-14.

\* cited by examiner

SELECTIVELY DESTAGING DATA UPDATES FROM WRITE CACHES ACROSS DATA STORAGE LOCATIONS

BACKGROUND

The present invention relates to data storage systems, and more specifically, this invention relates to selectively destaging data updates accumulated in write caches across more than data storage devices.

In conventional data replication systems, users issue input/output (I/O) requests to a single storage location, such as a primary storage location, which ultimately modifies data according to in the I/O requests received. In an effort to increase data retention, conventional data replication systems sometimes also implement a second storage location which is used to maintain a secondary (e.g., backup) copy of the data stored at the primary storage location. This redundant copy of the data at the recovery storage location is particularly useful in situations where the primary storage location becomes unavailable and/or experiences data loss. In some situations, the recovery storage location is even able to assume operational responsibility in response to determining that the primary storage location is unable to. A third data storage location is further implemented in some storage architectures to provide added data retention.

In such conventional systems, the primary storage location copies the I/O requests received from the users to the second storage location for implementation. For example, an asynchronous peer-to-peer remote copy relationship is established between the primary and secondary storage locations to ensure that I/O requests are mirrored therebetween. The second storage location in turn shares a relationship with the third data storage location such that I/O requests received from the primary storage location are passed along for implementation. While implementing a third storage location is able to improve data retention, these types of conventional architectures experience significant operational inefficiencies during operation.

For instance, the order in which I/O requests are implemented across the different storage locations has a significant effect on the efficiency by which the overall system is able to operate. Point-in-time copies are implemented in order to mirror larger numbers of data updates across the different storage locations concurrently. However, certain data updates are mirrored between storage locations removed from the more structured data replication procedures, e.g., such as point-in-time copies, in order to avoid overflow situations. While overflow situations are avoided, implementing these removed data updates involves performing additional processes which ultimately result in significant performance delays and disruption to ongoing data replication procedures.

SUMMARY

A computer-implemented method, according to one embodiment, includes: performing an iterative process for each portion of data in a write cache. The iterative process includes: determining whether a given portion of data was added to the write cache prior to completion of a most recent flash copy operation. In response to determining that the given portion of data was not added to the write cache prior to completion of a most recent flash copy operation, a determination is made as to whether the given portion of data has a clock bit value corresponding thereto. In response to determining that the given portion of data does not have a clock bit value corresponding thereto, a clock bit value calculated for the given portion of data. The clock bit value is calculated based on a current amount of unused storage capacity in the write cache. Moreover, in response to determining that the given portion of data has a clock bit value corresponding thereto, the clock bit value is decremented by a predetermined amount.

It follows that various ones of the approaches included herein are desirably able to distinguish between data written before completion of a most recent flash copy operation from data written after completion of the most recent flash copy operation. Accordingly, the approaches included herein are able to delay destaging data which was written after completion of the most recent flash copy operation as long as possible without experiencing cache overflow issues. This is achieved by prioritizing the destaging of data written before completion of a most recent flash copy over data written thereafter. For instance, in some approaches, a given portion of data is destaged to a tertiary data storage location in response to determining that the given portion of data was added to the write cache prior to completion of a most recent flash copy operation.

Avoiding cache overflow issues is also greatly desired as operational efficiency of the overarching system is improved as a result. This is achieved by selectively ordering performance of different data modifications such that an ideal balance is struck between write cache utilization and destaging operation. For instance, in some approaches a given portion of data is destaged to a tertiary data storage location in response to determining that decrementing the clock bit value thereof by the predetermined amount has caused the clock bit value to reach a predetermined value. As a result, various approaches included herein are able to increase the probability that modified data will be successfully transferred to the target data storage location while improving system performance, reducing performance delays, conserving computing resources, etc. These improvements are particularly notable in comparison to the extensive number of inefficiencies which have plagued conventional systems.

A computer program product, according to another embodiment, includes a computer readable storage medium having program instructions embodied therewith. The program instructions readable and/or executable by a processor to cause the processor to: perform the foregoing method.

A secondary data storage device, according to yet another embodiment, includes: a processor, and logic integrated with the processor, executable by the processor, or integrated with and executable by the processor. The logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
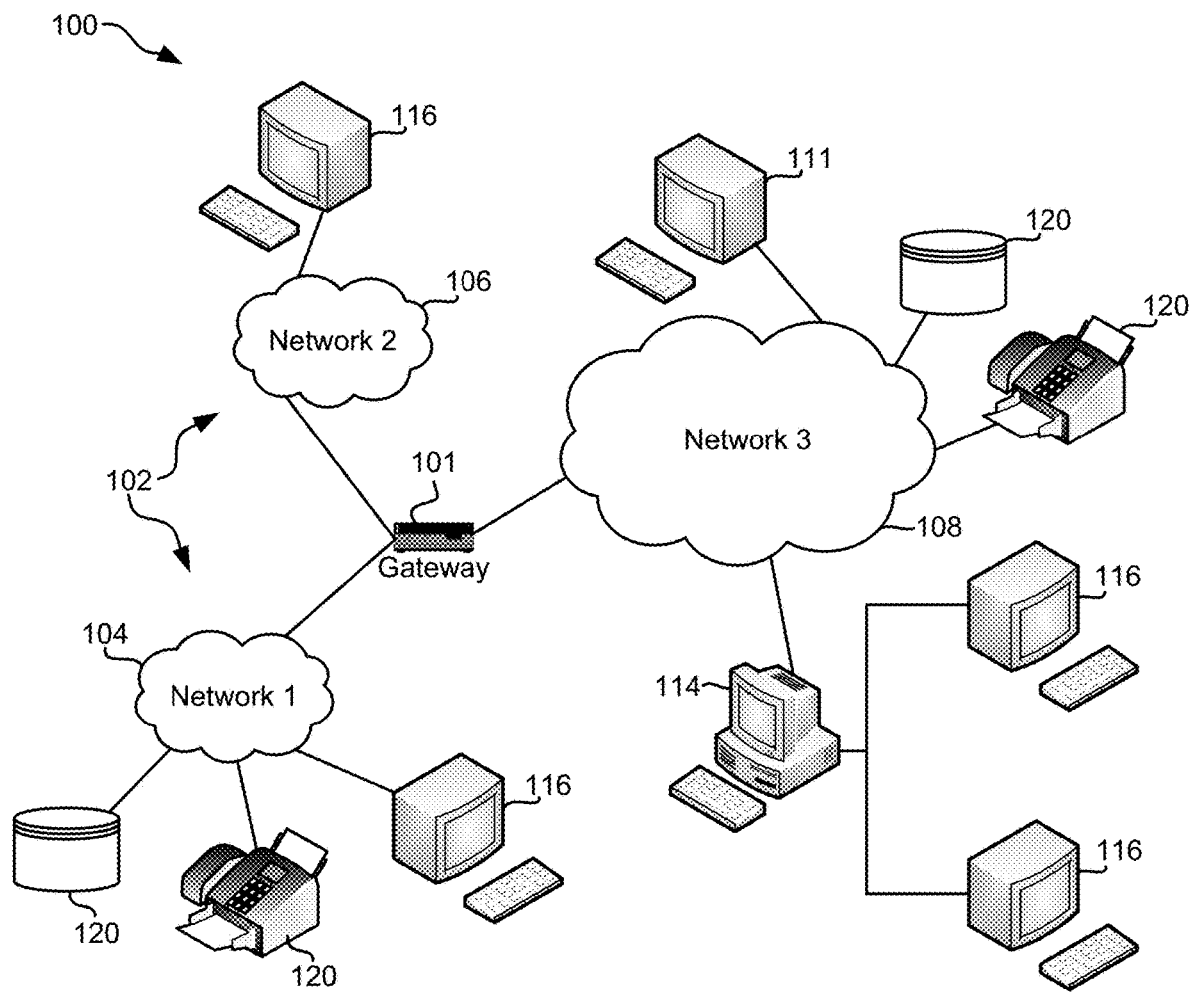
FIG. 1 is a network architecture, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for efficiently destaging data updates across more than one data storage location. Various ones of the approaches included herein are desirably able to distinguish between data written before completion of a most recent flash copy operation from data written after completion of the most recent flash copy operation. Accordingly, the approaches included herein are able to delay destaging data which was written after completion of the most recent flash copy operation as long as possible without experiencing cache overflow issues, thereby improving system performance, reducing performance delays, conserving computing resources, etc., e.g., as will be described in further detail below.

In one general approach, a computer-implemented method includes: performing an iterative process for each portion of data in a write cache. The iterative process includes: determining whether a given portion of data was added to the write cache prior to completion of a most recent flash copy operation. In response to determining that the given portion of data was not added to the write cache prior to completion of a most recent flash copy operation, a determination is made as to whether the given portion of data has a clock bit value corresponding thereto. In response to determining that the given portion of data does not have a clock bit value corresponding thereto, a clock bit value calculated for the given portion of data. The clock bit value is calculated based on a current amount of unused storage capacity in the write cache. Moreover, in response to determining that the given portion of data has a clock bit value corresponding thereto, the clock bit value is decremented by a predetermined amount.

In another general approach, a computer program product includes a computer readable storage medium having program instructions embodied therewith. The program instructions readable and/or executable by a processor to cause the processor to: perform the foregoing method.

In yet another general approach, a secondary data storage device includes: a processor, and logic integrated with the processor, executable by the processor, or integrated with and executable by the processor. The logic is configured to: perform the foregoing method.

FIG. 1 illustrates an architecture 100, in accordance with one approach. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one approach.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some approaches.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
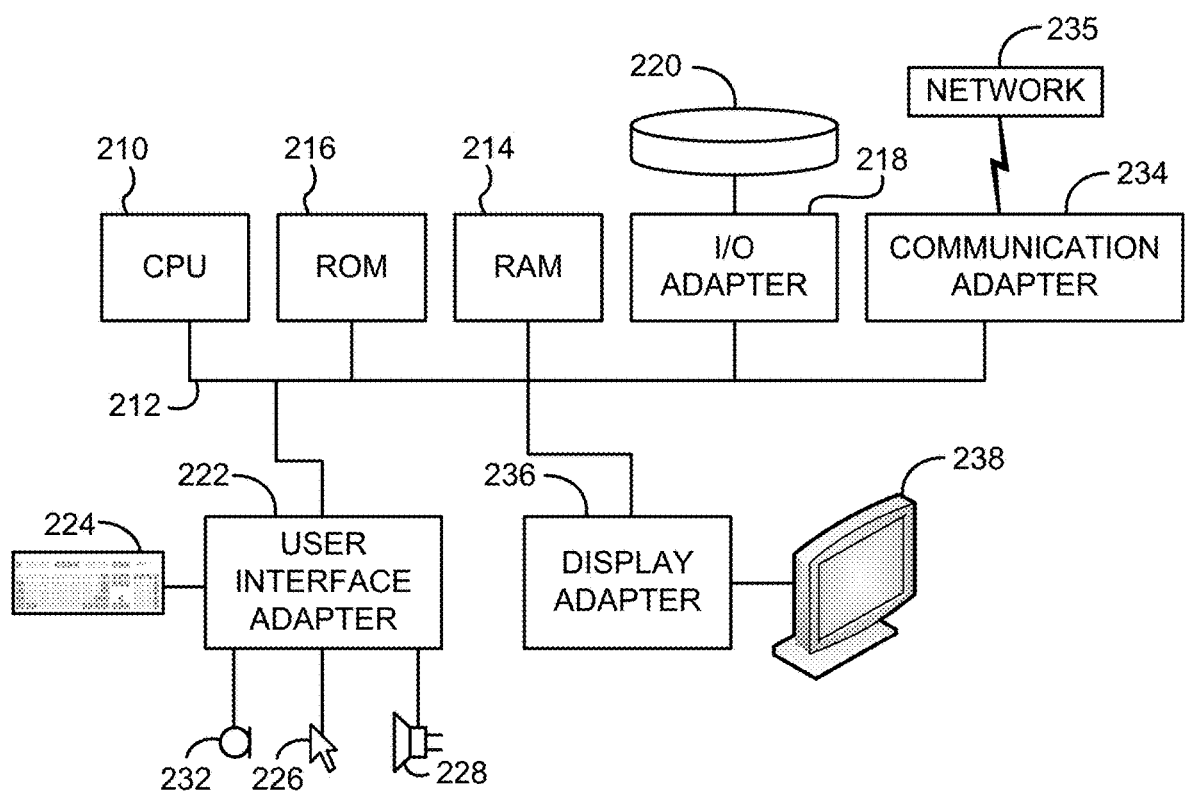
FIG. 2 is a representative hardware environment that may be associated with the servers and/or clients of FIG. 1, in accordance with one approach.

FIG. 2 shows a representative hardware environment associated with a user device 116 and/or server 114 of FIG. 1, in accordance with one approach. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM)

216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred approach may also be implemented on platforms and operating systems other than those mentioned. A preferred approach may be written using eXtensible Markup Language (XML), C, and/or C++ language, or other programming languages, along with an object oriented programming methodology. Object oriented programming (OOP), which has become increasingly used to develop complex applications, may be used.

Figure 3:
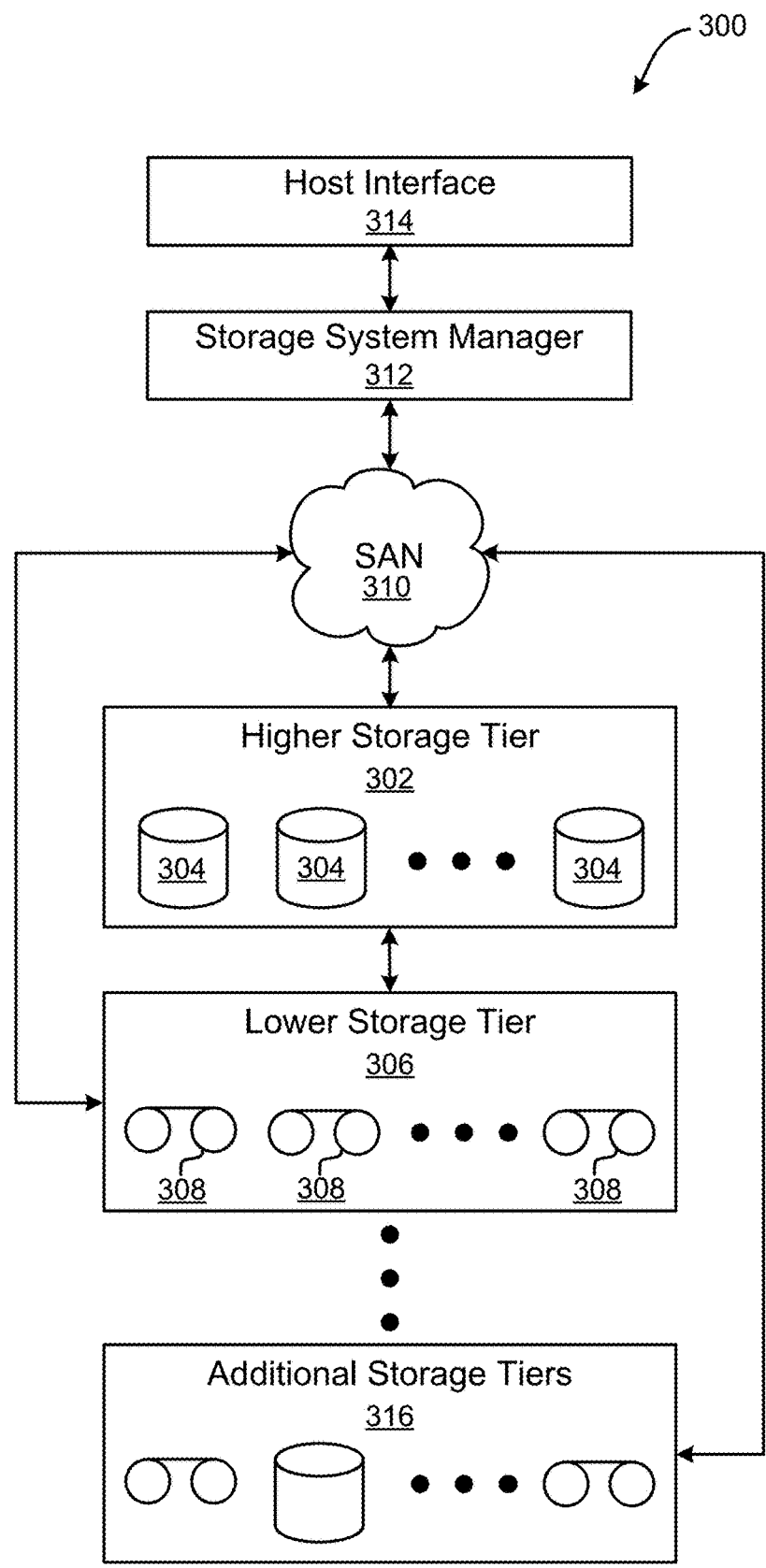
FIG. 3 is a tiered data storage system in accordance with one approach.

Now referring to FIG. 3, a storage system 300 is shown according to one approach. Note that some of the elements shown in FIG. 3 may be implemented as hardware and/or software, according to various approaches. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the approaches presented herein.

According to some approaches, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various approaches.

As previously mentioned, data storage systems typically maintain more than one copy of data in an effort to increase data retention. For instance, a second storage location is used to maintain a secondary (e.g., backup) copy of the data stored at a primary storage location. This redundant copy of the data at the second storage location is particularly useful in situations where the primary storage location becomes unavailable and/or experiences data loss. In some situations, the recovery storage location is even able to assume operational responsibility in response to determining that the primary storage location is unable to. A third data storage location is further implemented in some storage architectures to provide added data retention.

For instance, a primary storage location copies the I/O requests received from the users to the second storage location for implementation. For example, an asynchronous peer-to-peer remote copy relationship is established between the primary and secondary storage locations to ensure that I/O requests are mirrored therebetween. The second storage location in turn shares a relationship with the third data storage location such that I/O requests received from the primary storage location are passed along for implementation. While maintaining multiple copies of the same data at different storage locations increases data retention, the process of implementing updates across the different storage locations in conventional systems has introduced significant inefficiencies.

According to an example, the order in which I/O requests are implemented across the different storage locations has a significant effect on the efficiency by which the overall system is able to operate. Point-in-time copies are implemented in order to mirror larger numbers of data updates across the different storage locations concurrently. However, certain data updates are mirrored between storage locations removed from the more structured data replication procedures, e.g., such as point-in-time copies, in order to avoid overflow situations. While overflow situations are avoided, implementing these removed data updates involves performing additional processes which ultimately result in significant performance delays and disruption to ongoing data replication procedures. Conventional data replication systems have thereby been unable to efficiently and effectively implement user I/O requests across multiple storage devices.

In sharp contrast to the aforementioned shortcomings experienced by conventional data replication systems, various ones of the approaches included herein are able to efficiently maintain more than one copy of data across more than one data storage location. Accordingly, I/O requests are implemented across the data storage locations without experiencing the performance delays which have plagued conventional systems, also without compromising data retention, e.g., as will be described in further detail below.

Figure 4:
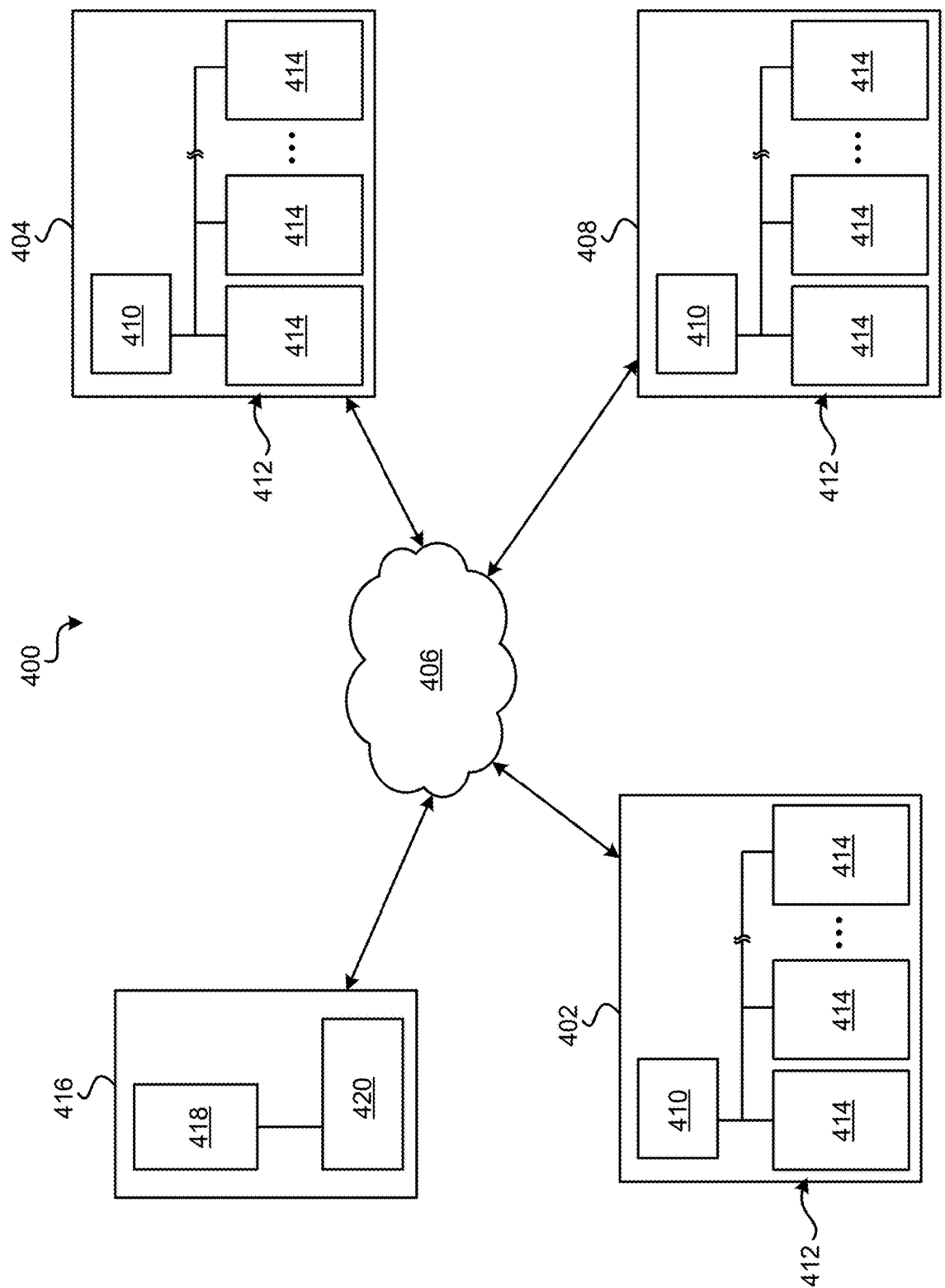
FIG. 4 is a partial representational view of a distributed data storage system in accordance with one approach.

Looking to FIG. 4, a distributed data storage system 400 is illustrated in accordance with one approach. As an option, the present distributed data storage system 400 may be implemented in conjunction with features from any other approach listed herein, such as those described with reference to the other FIGS. However, such distributed data storage system 400 and others presented herein may be used in various applications and/or in permutations which may or may not be specifically described in the illustrative approaches listed herein. Further, the distributed data storage system 400 presented herein may be used in any desired environment. Thus FIG. 4 (and the other FIGS.) may be deemed to include any possible permutation.

As show, the distributed data storage system 400 includes a primary data storage location 402 and a secondary data storage location 404, both of which are connected to a network 406. A tertiary data storage location 408 location is also connected to the network 406, which may be any type of network, e.g., depending on the desired approach. For instance, in some approaches the network 406 is a WAN, e.g., such as the Internet. However, an illustrative list of other network types which network 406 may implement includes, but is not limited to, a LAN, a PSTN, a SAN, an internal telephone network, etc. Accordingly, the primary data storage location 402, the secondary data storage location 404, and the tertiary data storage location 408 are able to communicate with each other regardless of the amount of separation which exists therebetween, e.g., despite being positioned at different geographical locations.

It should be noted that, with respect to the present description, a "data storage location" may also be interpreted as a data storage device in some approaches. Accordingly, two data storage devices that are located at a same general site (e.g., in a same enclosure) may still be considered to be two distinct data storage locations.

Each of the primary, secondary, and tertiary data storage locations 402, 404, 408 include a controller 410 (e.g., processor) which is coupled to a memory array 412. Depending on the approach, the memory array 412 included in each of the primary, secondary, and tertiary data storage locations 402, 404, 408 may consist of different types of storage components 414. For instance, the memory array 412 at the primary data storage location 402 includes higher performance storage components than those included at the secondary data storage location 404 in some approaches. Similarly, the memory array 412 at the secondary data storage location 404 includes relatively higher performance storage components than those included at the tertiary data storage location 408 in some approaches.

It should be noted that in terms of the present description, "higher performance" may be measured with respect to achievable throughput, performance delays, reliability factors, industry standards, product specifications, etc. In other words, the primary data storage location 402 includes storage components which have a higher achievable throughput, lower performance delays, higher reliability factors, etc. in comparison to those of the storage components included at the secondary and tertiary data storage locations 404, 408, respectively.

A host 416 (e.g., a user) is also connected to the network 406. The primary data storage location 402 may serve as an interface between the host 416 and the remainder of the distributed data storage system 400 in some approaches. Thus, the primary data storage location 402 receives and processes I/O requests originated by the host 416 and/or other hosts which may also be coupled to the network 406. As shown, the host 416 includes a controller 418 (e.g., processor) which is further coupled to memory 420 which may be used to at least temporarily store information (e.g., such as data, I/O requests, metadata, etc.). However, in some approaches the host 416 may actually be a microprocessor, e.g., such as a z14 microprocessor offered by IBM having a sales office at 1 New Orchard Rd., Armonk, N.Y. 10504.

Once again, various ones of the approaches included herein are able to efficiently maintain more than one copy of data across more than one data storage location. Accordingly, the distributed data storage system 400 and the components included therein are desirably able to mirror I/O operations across primary, secondary, and tertiary data storage locations in an efficient and effective manner. Each of the primary, secondary, and tertiary data storage locations maintain a copy of the same data and assume the responsibility of keeping the copies in synch, even in situations where failure events are experienced during an update (e.g., write operation) being performed thereto, e.g., as will be described in further detail below.

Figure 5:
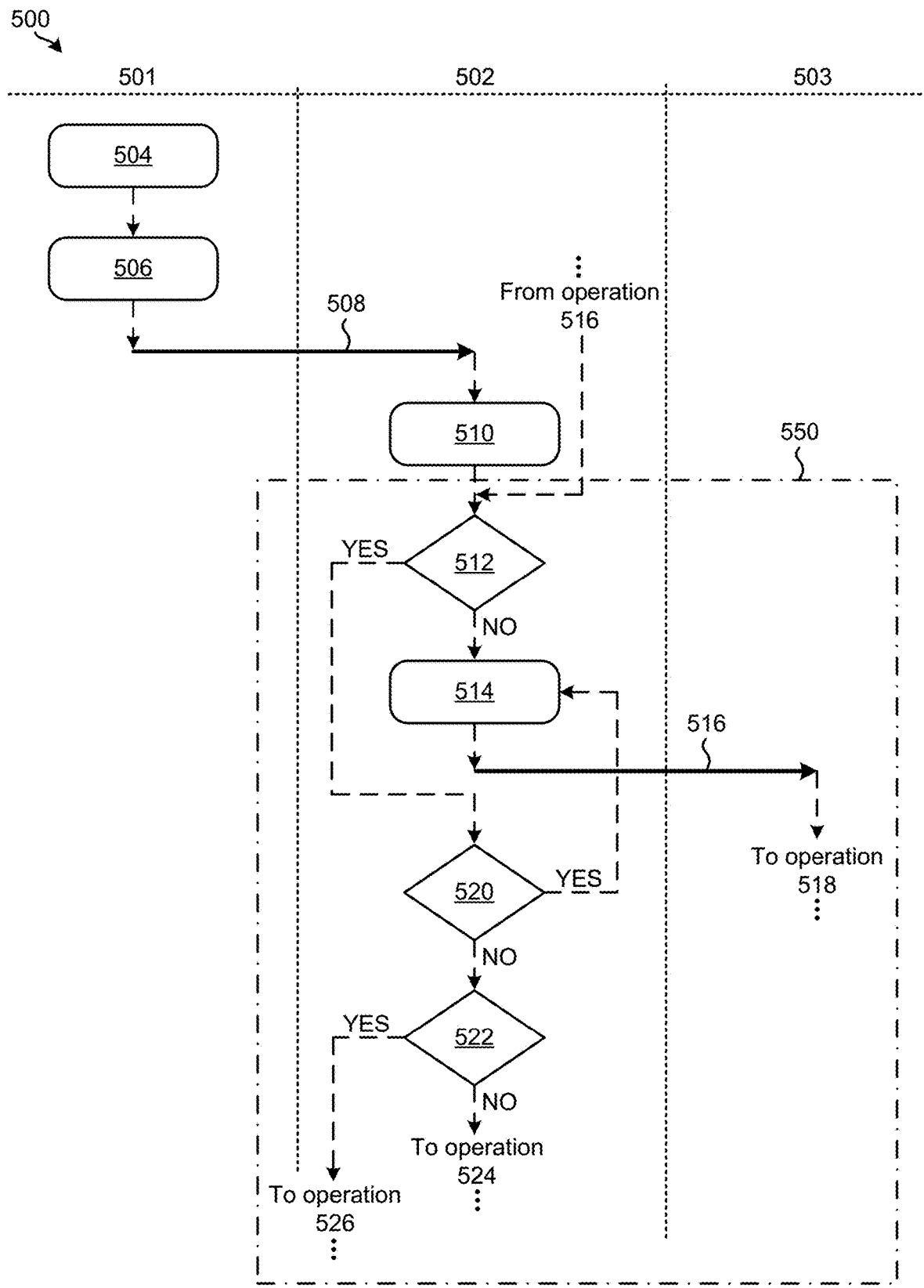
FIG. 5 is a flowchart of a method in accordance with one approach.
Figure 5:
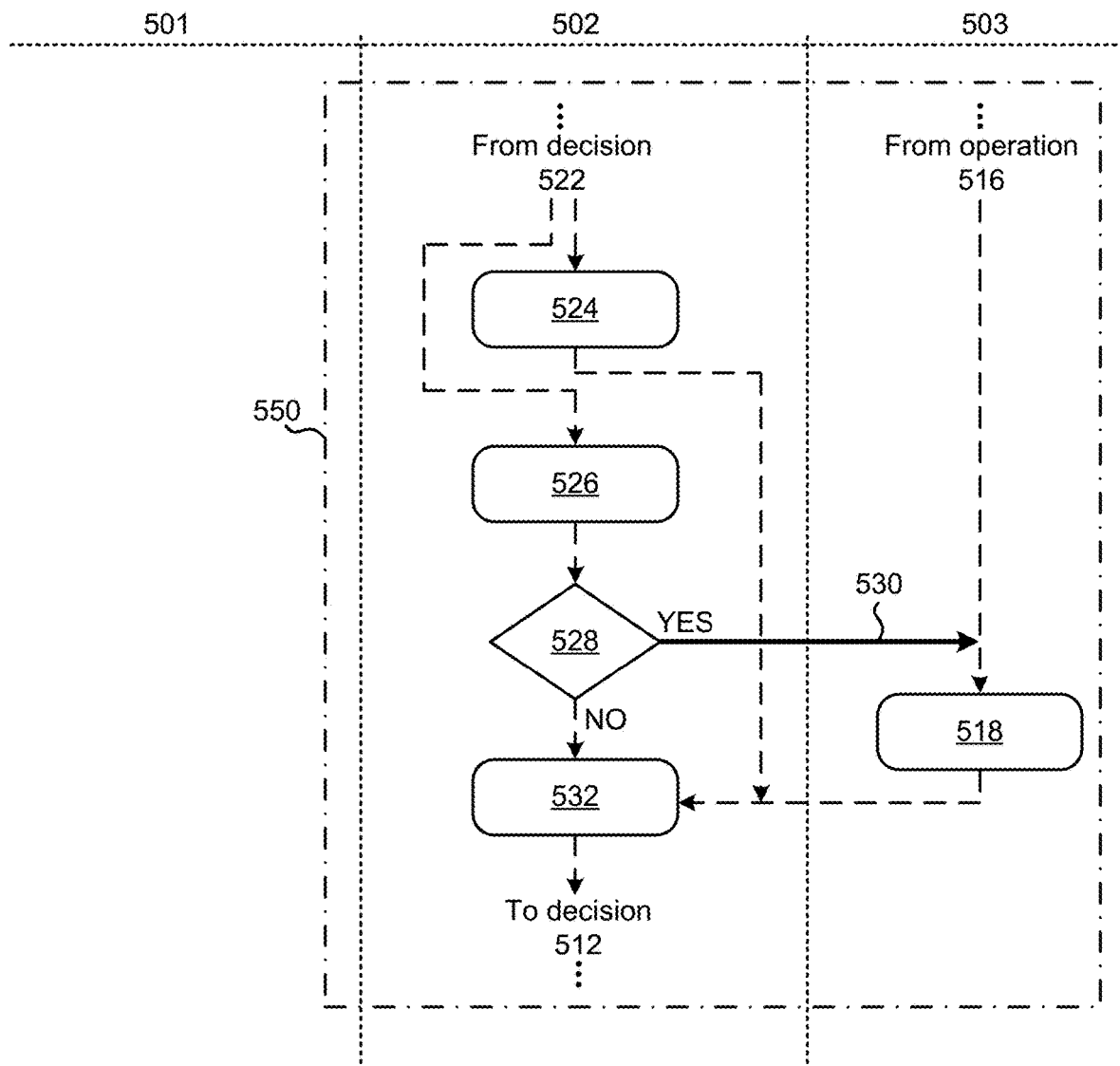

For instance, looking now to FIG. 5, a flowchart of a computer-implemented method 500 for mirroring I/O operations across more than one data storage location is shown according to one approach. The method 500 may be performed in accordance with the present invention in any of the environments depicted in FIGS. 1-4, among others, in various approaches. Of course, more or less operations than those specifically described in FIG. 5 may be included in method 500, as would be understood by one of skill in the art upon reading the present descriptions.

Each of the steps of the method 500 may be performed by any suitable component of the operating environment. For example, each of the nodes 501, 502, 503 shown in the flowchart of method 500 may correspond to one or more processors positioned at a different location in a multi-tiered data storage system. Moreover, each of the one or more processors are preferably configured to communicate with each other.

In various approaches, the method 500 may be partially or entirely performed by a controller, a processor, etc., or some other device having one or more processors therein. The processor, e.g., processing circuit(s), chip(s), and/or module (s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 5 includes different nodes 501, 502, 503, each of which represent one or more processors, controllers, computer, etc., positioned at a different location in a multi-tiered data storage system. For instance, node 501 may include one or more processors which are electrically coupled to a primary data storage location of a distributed data storage system (e.g., see 402 of FIG. 4 above). Node 502 may include one or more processors which are electrically coupled to a secondary data storage location of a distributed data storage system (e.g., see 404 of FIG. 4 above). Furthermore, node 503 may include one or more processors which are electrically coupled to a tertiary data storage location of a distributed data storage system (e.g., see 408 of FIG. 4 above). Accordingly, commands, data, requests, etc. may be sent between each of the nodes 501, 502, 503 depending on the approach. Moreover, it should be noted that the various processes included in method 500 are in no way intended to be limiting, e.g., as would be appreciated by one skilled in the art after reading the present description. For instance, data sent from node 502 to node 503 may be prefaced by a request sent from node 503 to node 502 in some approaches.

As shown, operation 504 of method 500 is performed by the one or more processors at node 501 and includes receiving I/O requests from one or more hosts (e.g., users) in communication therewith. Moreover, operation 506 includes implementing the I/O requests that are received. The I/O requests received vary depending on the particular approach, but may include write requests (e.g., new write requests, append write requests, rewrite requests, etc.), read requests, delete requests, etc. Moreover, the received I/O requests may be implemented using any processes which would be apparent to one skilled in the art after reading the present description.

Proceeding to operation 508, the I/O requests received from the one or more hosts are forwarded to the secondary data storage location. The I/O requests may be forwarded to the secondary data storage location differently depending on the given approach. For instance, in some approaches the I/O requests may be transmitted to the secondary data storage location as soon as they are implemented at the primary data storage location. In other approaches, I/O requests are accumulated in a queue and transmitted to the secondary data storage location as a group (e.g., data packet). In still other approaches, an asynchronous peer-to-peer remote copy relationship is established between the primary and secondary data storage locations which ensures that I/O requests are mirrored therebetween over time.

Upon being received at the secondary data storage location, the I/O requests are added to a cache and implemented in the secondary data storage location. See operation 510. It follows that as the I/O requests are received, they are added to an established cache and eventually implemented in the secondary data storage location. As these I/O requests are implemented, the copy of data stored at the secondary data storage location is made to more accurately mirror the data stored at the primary data storage location, thereby improving data retention.

Although implementing I/O requests at the secondary data storage location is relatively straightforward, the process of mirroring these I/O requests to a tertiary data storage location is significantly more difficult. As noted above, this increased difficulty has caused conventional systems to experience significant inefficiencies in maintaining data across different storage locations, thereby undesirably leading to performance delays, data vulnerability, inefficient use of system resources, etc. In sharp contrast, the approaches described herein are able to efficiently and effectively mirror I/O requests across a number of data storage locations.

Referring still to FIG. 5, decision 512 is the initial process of an iterative procedure which is performed for each portion of data in a write cache (e.g., non-volatile storage such as a battery backed write cache) at the secondary data storage location. The other processes included in this iterative procedure have also been identified as being encircled in the dashed box 550. In other words, decision 512 initiates an iterative procedure which repeats the various processes included in dashed box 550 for each portion of data (e.g., file, track, etc.) in a write cache. It follows that this iterative procedure may continue to repeat over time as additional data is introduced to the write queue during operation. However, it should be noted that none of the processes included in the iterative procedure are intended to limit the invention, and are only presented by way of example.

Looking to decision 512, a determination is made as to whether a given portion of data in the write cache corresponds to a flash copy operation associated with a mirrored data replication architecture. With respect to the present description, a "flash copy operation" is intended to refer to a data replication operation which is capable of creating rapid copies of data stored in memory. According to an exemplary approach, which is in no way intended to limit the invention, the flash copy operation involves creating point-in-time snapshot copies of entire logical volumes and/or data sets in memory. According to another example, the flash copy operation may involve performing an incremental flash copy operation, e.g., as would be appreciated by one skilled in the art after reading the present description.

Moreover, a "mirrored data replication architecture" is intended to refer to an architecture that provides data replication between two data storage locations which may be separated by extended distances. According to an exemplary approach, which is in no way intended to limit the invention, the mirrored data replication architecture is a Global Mirror configuration offered by IBM having a sales office at 1 New Orchard Rd., Armonk, N.Y. 10504. Accordingly, if adequate bandwidth exists between the two data storage locations, the mirrored data replication architecture is capable of providing a recovery point objective (RPO) of as low as about 3 to about 5 seconds between the two data storage locations at extended distances with no performance impact on applications operating at the primary data storage location. In some approaches the mirrored data replication architecture is able to replicate data asynchronously between data storage locations and is also able to form a consistency group at a regular interval, thereby allowing a clean recovery of the relevant applications, e.g., as would be appreciated by one skilled in the art after reading the present description.

Portions of data in the write cache which are determined as not corresponding to a flash copy operation are essentially removed from the mirrored data replication architecture. Rather, this data is mirrored between the data storage locations using alternate replication operations. For instance, one or more clock bits may be used to determine if and/or when such a portion of data is to be destaged to another data storage location. Accordingly, method 500 proceeds to operation 514 in response to determining that the given portion of data in the write cache does not correspond to a flash copy operation. There, operation 514 includes using nominal clock bits to identify when the given portion of data should be destaged to the tertiary data storage location at node 503. The nominal clock bits may be initialized and monitored according to any procedures which would be apparent to one skilled in the art after reading the present description. For example, a same predetermined value may be set as the clock bit for each portion of data identified as not corresponding to a flash copy operation. Moreover, the nominal clock bits may be decremented in a same or similar fashion for all portions of data identified as not corresponding to a flash copy operation.

The given portion of data is further destaged to the tertiary data storage location at node 503 when the nominal clock bits corresponding thereto indicate it is time to do so. See operation 516. Upon being received at the tertiary data storage location, the given portion of data is added to a cache and implemented in the tertiary data storage location. See operation 518. As mentioned above, the portions of data are added to an established cache and eventually implemented in the tertiary data storage location as they are received. Implementing the portions of data thereby causes the copy of data stored at the tertiary data storage location to more accurately mirror the data stored at the primary and secondary data storage locations, thereby further improving data retention.

Returning to decision 512, method 500 jumps to decision 520 in response to determining that the given portion of data in the write cache does correspond to a flash copy operation associated with a mirrored data replication architecture. There, decision 520 includes determining whether the given portion of data was added to the write cache prior to completion of a most recent flash copy operation. As mentioned above, a "flash copy operation" refers to a data replication operation which is capable of creating rapid copies of large portions of data stored in memory. According to an exemplary approach, which is in no way intended to limit the invention, the flash copy operation involves creating point-in-time snapshot copies of entire logical volumes and/or data sets in memory which may thereby be used to update another copy of the same logical volumes and/or data sets in a separate memory. Accordingly, each time a flash copy operation is performed between the secondary and tertiary data storage locations, the data stored at each location is made to effectively be the same at that point in time.

However, the process of performing data modifications (e.g., write operations) at a given storage location varies depending on when the modifications are performed with respect to the ongoing flash copy operations. For instance, a modification performed on data at the secondary data storage location which was incorporated in a most recent flash copy operation can be replicated to the tertiary data storage location without experiencing issues. This is because the data being modified is the same at both the secondary and tertiary data storage locations. However, a modification performed on data at the secondary data storage location which was not incorporated in a most recent flash copy operation cannot be replicated to the tertiary data storage location without first updating the data stored at the tertiary data storage location. This is because the data that was modified at the secondary data storage location is likely different than (e.g., an earlier version of) the data stored at the tertiary data storage location.

Accordingly, a supplemental data update operation is performed prior to replicating data modifications in situations where the data modifications correspond to data which was not incorporated in a most recent flash copy operation. In some approaches this supplemental data update operation includes performing a copy source to target (CST) operation which ensures the data at the secondary and tertiary storage locations are accurate copies of each other. However, any data update operation which would be apparent to one skilled in the art after reading the present description may be implemented, e.g., depending on the desired approach. As a result, data modifications may be successfully destaged from the secondary data storage location to the tertiary data storage location.

Returning to decision 520, in some approaches determining whether a given portion of data was added to the write cache prior to completion of a most recent flash copy operation includes comparing a generation number associated with the given portion of data with the most recent flash copy operation. Each portion of data (e.g., data modification operation) has a generation number associated therewith which is based on the flash copy operation relevant when the portion of data was formed. However, decision 520 may be performed using any desired processes. For example, in some approaches one or more flags are used to identify whether each portion of data in the write cache was added prior to completion of a most recent flash copy operation.

Method 500 returns to operation 514 in response to determining that the given portion of data was added to the write cache prior to completion of a most recent flash copy operation. As mentioned above, operation 514 includes using nominal clock bits to identify when the given portion of data should be destaged to the tertiary data storage location at node 503. However, method 500 proceeds to decision 522 in response to determining that the given portion of data was not added to the write cache prior to completion of a most recent flash copy operation. As mentioned above, this signifies a situation where the data at the secondary data storage location which was modified is not accurately represented at the tertiary data storage location. It follows that attempts to replicate the same modifications at the tertiary data storage location will not produce the intended result, but rather fragment the data at the two storage locations.

Decision 522 includes determining whether the given portion of data has a mirror clock bit value corresponding thereto. In other words, decision 522 includes determining whether a clock bit value which corresponds to the mirrored data replication architecture has already been assigned to the given portion of data. As previously mentioned, the various processes included in the iterative procedure (see box 550) are continually repeated for each portion of data included in a write cache. Therefore, any number of these processes may be repeatedly performed on the same portion of data.

In response to determining that the given portion of data does not have a mirror clock bit value corresponding thereto, method 500 proceeds to operation 524. There, operation 524 includes calculating a mirror clock bit value for the given portion of data. Although the mirror clock bit value may be calculated a number of different ways depending on the approach, it is preferred that the mirror clock bit value is calculated based on a current amount of unused storage capacity in the write cache. Incorporating the current amount of unused storage capacity in the write cache when calculating the mirror clock bit values desirably allows for cache overflow situations to be avoided while also improving efficiency of data replication. Once again, data modifications which are not implemented in a most recent flash copy operation cannot successfully be destaged to another storage location without first performing a supplemental data update operation which significantly increases performance delays and reduces data retention. Alternatively, these data modifications may be held in the write queue until a subsequent flash copy operation is performed, thereby obviating the importance of performing a supplemental data update operation before destaging the given data modifications. The write cache does have a limited storage capacity however, and therefore the mirror clock bit values are preferably calculated such that cache overflow situations are avoided.

According to an example, which is in no way intended to limit the invention, Equation 1 below may be used to calculate the mirror clock bit value for a given portion of data.

$$\text{mirror clock bit value} = W - \text{Max}\left(\frac{A}{B} \times Y; \frac{C}{D} \times Z\right) \quad \text{Equation 1}$$

As included in Equation 1, the variables "W", "Y", and "Z" are constants which can be set according to a predetermined value, determined experimentally, calculated, etc., depending on the desired approach. Moreover, variable "A" represents a current amount of the write cache occupied by portions of data, e.g., an overall amount of the write cache which is currently used. Variable "B" further represents a total storage capacity (e.g., amount of memory) of the write cache, variable "C" represents the amount of the write cache's storage capacity used by the rank which the given portion of memory is included in, and finally variable "D" represents the total amount of storage capacity in the write cache that the storage array (e.g., rank) is able to use. With respect to the present description, a "rank" is a larger grouping of data which may include a number of portions of data (e.g., tracks) as would be appreciated by one skilled in the art after reading the present description.

In view of Equation 1, portions of data (e.g., tracks) serve as thresholds in the write cache in two ways. First, the write cache as a whole can become filled as portions of data are added thereto. However, each rank also has a limited amount of storage space available thereto in the write cache and can thereby reach a limit. For example, a system may prespecify that each rank can take only use 25% of the total storage capacity of the write cache as a whole. Therefore, if one of the ranks reaches 25% of the total storage capacity of the write cache, the rank is temporarily prevented from acquiring any more portions of data (e.g., until the rank shrinks in size relative to its relative size limit). This desirably prevents any storage issues experienced by a given rank to consume all of the storage capacity of the write cache. It should also be noted that any of the variables included in Equation 1 may be represented in any desired units and/or forms. For example, variable "A" may be represented as a percentage of the total capacity, a specific amount of memory (e.g., in gigabytes), a ratio, etc. According to another example, which is in no way intended to limit the invention, the variable "Y" may have a value of 15 in some approaches, but may be higher or lower depending on the desired approach.

Returning to decision 522, method 500 jumps to operation 526 in response to determining that the given portion of data has a mirror clock bit value corresponding thereto. As shown, operation 526 includes decrementing the mirror clock bit value which corresponds to the given portion of data by a predetermined amount. The mirror clock bit value may be decremented in any desired way; however it is preferred that the mirror clock bit values are decremented in a manner which considers the current amount of unused storage capacity in the write cache. According to an example, which again is in no way intended to limit the invention, the mirror clock bit value for a given portion of data is decremented by a value of three each time the given portion of data is examined as a part of the iterative process. The amount by which the mirror clock bit value is decremented may be predetermined by a user, based on industry standards, based on system performance capabilities, by a size of the write cache, data flow rates, etc.

From operation 526, method 500 proceeds to decision 528 which determines if the mirror clock bit value for the given portion of data has reached a predetermined value after being decremented in operation 526. Again, the value may be predetermined by a user, a system manager, based on architecture settings, etc. According to an example, which is in no way intended to limit the invention, the mirror clock bit value for the given portion of data has reached the predetermined value in response to being decremented to a value of zero. In response to determining that the mirror clock bit value for the given portion of data has not reached the predetermined value after being decremented, method 500 proceeds to operation 532. There, operation 532 includes advancing to a subsequent portion of data in the write cache, before returning to decision 512. In other words, the given portion of data is maintained in the write cache in response to determining that decrementing the clock bit value by the predetermined amount has not caused it to reach the predetermined value. As noted above, this provides additional time for the given portion of data to be incorporated in a subsequent flash copy operation, thereby improving performance of the overarching system.

Referring still to FIG. 5, in response to determining that the mirror clock bit value for the given portion of data has reached the predetermined value, method 500 proceeds to operation 530 which includes destaging the given portion of data to the tertiary data storage location at node 503. Upon being received at the tertiary data storage location, the given portion of data is added to a cache and implemented in the tertiary data storage location. See operation 518. From operation 518, method 500 proceeds to operation 532 which, as noted above, includes advancing to a subsequent portion of data in the write cache, before returning to decision 512. Method 500 also proceeds to operation 532 from operation 524 as shown in FIG. 5.

It follows that the processes in method 500 allow for data modifications to be efficiently and successfully replicated across different data storage locations while also avoiding cache overflow situations. This improves operational efficiency of the overarching system by selectively ordering performance of different data modifications such that an ideal balance is struck between write cache utilization and destaging operation.

Again, various ones of the approaches included herein are desirably able to distinguish between data written before completion of a most recent flash copy operation from data written after completion of the most recent flash copy operation. Accordingly, the approaches included herein are able to delay destaging data which was written after completion of the most recent flash copy operation as long as possible without experiencing cache overflow issues. This is achieved by prioritizing the destaging of data written before completion of a most recent flash copy over data written thereafter. This prioritization is achieved by calculating an amount of time that each portion of modified data is able to remain in the write cache, waiting until a next flash copy operation. As a result, various approaches included herein are able to increase the probability that modified data will be successfully transferred to the target data storage location while improving system performance, reducing performance delays, conserving computing resources, etc. These improvements are particularly notable in comparison to the extensive number of inefficiencies which have plagued conventional systems.

While preferred, waiting to destage certain portions of data until a subsequent flash copy operation is performed is not always practical, e.g., in situations where the write cache becomes undesirably full. Accordingly, in situations where the write cache becomes undesirably full, performance delays may be incurred by destaging data which was written after completion of the most recent flash copy in order to avoid overflowing the write cache.

It should also be noted that the various approaches included herein are in no way intended to limit the invention. For instance, although many of the approaches are described above in the context of a distributed data storage system having three different data storage locations, any number of data storage locations may be implemented. Moreover, the relationship shared between each of the data storage locations may vary depending on the desired approach.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   performing an iterative process for each portion of data in a write cache, wherein the iterative process includes:
   determining whether a given portion of data was added to the write cache prior to completion of a most recent flash copy operation;
   in response to determining that the given portion of data was not added to the write cache prior to completion of a most recent flash copy operation, determining whether the given portion of data has a clock bit value corresponding thereto;
   in response to determining that the given portion of data does not have a clock bit value corresponding thereto, calculating a clock bit value for the given portion of data, wherein the clock bit value is calculated based on a current amount of unused storage capacity in the write cache; and
   in response to determining that the given portion of data has a clock bit value corresponding thereto, decrementing the clock bit value by a predetermined amount.

2. The computer-implemented method of claim 1, wherein the iterative process includes:
   destaging the given portion of data to a tertiary data storage location in response to determining that decrementing the clock bit value by the predetermined amount has caused the clock bit value to reach a predetermined value.

3. The computer-implemented method of claim 2, wherein the iterative process includes:
   maintaining the given portion of data in the write cache in response to determining that decrementing the clock bit value by the predetermined amount has not caused the clock bit value to reach a predetermined value.

4. The computer-implemented method of claim 3, wherein the portions of data in the write cache correspond to write operations mirrored from a primary data storage location, wherein the write cache is maintained at a secondary data storage location.

5. The computer-implemented method of claim 1, wherein the iterative process includes:
   in response to determining that the given portion of data was added to the write cache prior to completion of a most recent flash copy operation, destaging the given portion of data to a tertiary data storage location.

6. The computer-implemented method of claim 1, wherein determining whether a given portion of data was added to the write cache prior to completion of a most recent flash copy operation includes comparing a generation number associated with the given portion of data with the most recent flash copy operation.

7. The computer-implemented method of claim 1, wherein the flash copy operation is an incremental flash copy operation.

8. A computer program product comprising a computer readable storage medium having program instructions embodied therewith, the program instructions readable and/or executable by a processor to cause the processor to:
   perform, by the processor, an iterative process for each portion of data in a write cache, wherein the iterative process includes:
   determining whether a given portion of data was added to the write cache prior to completion of a most recent flash copy operation;
   in response to determining that the given portion of data was not added to the write cache prior to completion of a most recent flash copy operation, determining whether the given portion of data has a clock bit value corresponding thereto;
   in response to determining that the given portion of data does not have a clock bit value corresponding thereto, calculating a clock bit value for the given portion of data, wherein the clock bit value is calculated based on a current amount of unused storage capacity in the write cache; and in response to determining that the given portion of data has a clock bit value corresponding thereto, decrementing the clock bit value by a predetermined amount.

9. The computer program product of claim 8, wherein the iterative process includes:

destaging the given portion of data to a tertiary data storage location in response to determining that decrementing the clock bit value by the predetermined amount has caused the clock bit value to reach a predetermined value.

10. The computer program product of claim 9, wherein the iterative process includes:

maintaining the given portion of data in the write cache in response to determining that decrementing the clock bit value by the predetermined amount has not caused the clock bit value to reach a predetermined value.

11. The computer program product of claim 8, wherein the portions of data in the write cache correspond to write operations mirrored from a primary data storage location, wherein the write cache is maintained at a secondary data storage location.

12. The computer program product of claim 8, wherein the iterative process includes:

in response to determining that the given portion of data was added to the write cache prior to completion of a most recent flash copy operation, destaging the given portion of data to a tertiary data storage location.

13. The computer program product of claim 8, wherein determining whether a given portion of data was added to the write cache prior to completion of a most recent flash copy operation includes comparing a generation number associated with the given portion of data with the most recent flash copy operation.

14. The computer program product of claim 8, wherein the flash copy operation is an incremental flash copy operation.

15. A secondary data storage device, comprising:

a processor; and logic integrated with the processor, executable by the processor, or integrated with and executable by the processor, the logic being configured to:

perform, by the processor, an iterative process for each portion of data in a write cache, wherein the iterative process includes:

determining whether a given portion of data was added to the write cache prior to completion of a most recent flash copy operation;

in response to determining that the given portion of data was not added to the write cache prior to completion of a most recent flash copy operation, determining whether the given portion of data has a clock bit value corresponding thereto;

in response to determining that the given portion of data does not have a clock bit value corresponding thereto, calculating a clock bit value for the given portion of data, wherein the clock bit value is calculated based on a current amount of unused storage capacity in the write cache; and in response to determining that the given portion of data has a clock bit value corresponding thereto, decrementing the clock bit value by a predetermined amount.

16. The secondary data storage device of claim 15, wherein the iterative process includes:

destaging the given portion of data to a tertiary data storage device in response to determining that decrementing the clock bit value by the predetermined amount has caused the clock bit value to reach a predetermined value.

17. The secondary data storage device of claim 16, wherein the iterative process includes:

maintaining the given portion of data in the write cache in response to determining that decrementing the clock bit value by the predetermined amount has not caused the clock bit value to reach a predetermined value.

18. The secondary data storage device of claim 15, wherein the portions of data in the write cache correspond to write operations mirrored from a primary data storage device.

19. The secondary data storage device of claim 15, wherein the iterative process includes:

in response to determining that the given portion of data was added to the write cache prior to completion of a most recent flash copy operation, destaging the given portion of data to a tertiary data storage device.

20. The secondary data storage device of claim 15, wherein determining whether a given portion of data was added to the write cache prior to completion of a most recent flash copy operation includes comparing a generation number associated with the given portion of data with the most recent flash copy operation.

* * * * *